UNITED STATES PATENT OFFICE.

MARY WISZNIEWSKA EMMÉ, OF NEW YORK, N. Y.

PROCESS OF WELDING ALUMINIUM.

SPECIFICATION forming part of Letters Patent No. 710,958, dated October 14, 1902.

Application filed March 21, 1901. Serial No. 52,142. (No specimens.)

*To all whom it may concern:*

Be it known that I, MARY WISZNIEWSKA EMMÉ, a citizen of the United States, residing at New York, in the county of New York and State of New York, have invented certain new and useful Improvements in Processes of Welding Aluminium, of which the following is a full and complete specification, such as will enable those skilled in the art to which it appertains to make and use the same.

The object of my invention is to provide a simple and effective process of welding aluminium or alloys of aluminium by means whereof a perfect, homogeneous, and permanent junction of the two ends of the metal may be accomplished.

I have discovered that by heating two contacting ends of aluminium under suitable conditions approximately to or above the temperature of 600° centigrade welding can be effected.

The invention consists in bringing the two or more pieces of thoroughly-cleansed metal or the two ends of the rods or wires of the metal into contact and applying a sufficiently high degree of heat to raise the parts to be united to the welding-point, whereupon they may be welded together. To carry out my process successfully, the parts or ends to be united must be scrupulously cleansed before heating them to the welding-point. The degree of heat required is approximately 600° centigrade and may vary, frequently requiring a slight excess. The correct temperature is reached when the aluminium commences to soften. By applying this heat when the parts are in contact they may be united or welded, whereby the mass or piece formed possesses throughout the same physical qualities as though the parts had never been separated—that is, the same tensile strength, the same flexibility, the same conductivity for heat or for electricity.

Having thus fully described my invention, what I claim as new, and desire to secure by Letters Patent, is—

The process of welding aluminium, which consists in bringing the thoroughly-cleansed parts of aluminium to be united, into contact, and applying heat to the same until the metal begins to soften, whereby they may be welded or permanently united, substantially as described.

In testimony that I claim the foregoing as my invention I have signed my name, in presence of the subscribing witnesses, this 20th day of March, 1901.

MARY WISZNIEWSKA EMMÉ.

Witnesses:
   F. A. STEWART,
   F. F. TELLER.